(12) United States Patent
Watanabe et al.

(10) Patent No.: US 12,473,011 B2
(45) Date of Patent: Nov. 18, 2025

(54) VEHICLE STEERING SYSTEM

(71) Applicants: HONDA MOTOR CO., LTD., Tokyo (JP); Thyssenkrupp Presta Aktiengesellschaft, Eschen (LI)

(72) Inventors: Yoshinobu Watanabe, Saitama (JP); Hayato Miyakawa, Saitama (JP); Munetsugu Hanji, Saitama (JP); Takaya Yamaguchi, Saitama (JP); Miklos Aranyi, Rebstein (CH); Adela Beres, Budapest (HU); Laszlo Dombai, Erd (HU); Peter Kakas, Budapest (HU)

(73) Assignees: HONDA MOTOR CO., LTD, Tokyo (JP); THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 609 days.

(21) Appl. No.: 17/909,169

(22) PCT Filed: Mar. 9, 2020

(86) PCT No.: PCT/JP2020/009971
§ 371 (c)(1),
(2) Date: Sep. 2, 2022

(87) PCT Pub. No.: WO2021/181446
PCT Pub. Date: Sep. 16, 2021

(65) Prior Publication Data
US 2023/0091186 A1    Mar. 23, 2023

(51) Int. Cl.
*B62D 5/00* (2006.01)
*B62D 6/00* (2006.01)

(52) U.S. Cl.
CPC ............. *B62D 5/006* (2013.01); *B62D 6/008* (2013.01)

(58) Field of Classification Search
CPC ................................ B62D 5/006; B62D 6/008
See application file for complete search history.

(56) References Cited

U.S. PATENT DOCUMENTS 9,043,123 B2 *   5/2015   Urabe ................... B60W 10/20
                                                 701/112
9,573,617 B2 *   2/2017   Shibuya .............. F02N 11/0814
                (Continued)

FOREIGN PATENT DOCUMENTS

| CN | 104995078 A | 10/2015 |
| CN | 106184349 A | 12/2016 |

(Continued)

OTHER PUBLICATIONS

Notice of Reasons for Refusal for Japanese Patent Application No. 2022-548108 dated Jun. 27, 2023; 8 pp.

(Continued)

*Primary Examiner* — Jacob D Knutson
(74) *Attorney, Agent, or Firm* — Armstrong Teasdale LLP

(57) ABSTRACT

To prevent a driver from feeling uncomfortable when the driver touches a steering member in a state where a driving source is stopped, a vehicle steering system (1) is provided in a vehicle (2) that travels by a driving force generated by a driving source (51). The vehicle steering system (1) includes; a steering member (10) configured to accept a steering operation; and a reaction force actuator (13) configured to apply a reaction force to the steering member (10) in response to the steering operation. In a state where the driving source (51) is stopped, the reaction force actuator (13) is configured to apply the reaction force to the steering member (10) based on a stopped time position that is a position of the steering member (10) at a time when the driving source (51) is stopped.

9 Claims, 6 Drawing Sheets

(56) References Cited

U.S. PATENT DOCUMENTS

| | | |
|---|---|---|
| 2009/0294209 A1 | 12/2009 | Bluhm |
| 2015/0353128 A1 | 12/2015 | Shibuya et al. |
| 2016/0347356 A1 | 12/2016 | Matsuda et al. |
| 2018/0080426 A1* | 3/2018 | Kuramochi ............ B62D 5/005 |
| 2018/0148088 A1 | 5/2018 | Katayama et al. |
| 2022/0297744 A1 | 9/2022 | Watanabe et al. |

FOREIGN PATENT DOCUMENTS

| | | |
|---|---|---|
| CN | 107856731 A | 3/2018 |
| DE | 102014016017 A1 | 5/2016 |
| DE | 112019007714 T5 | 6/2022 |
| EP | 1013536 A2 | 6/2000 |
| JP | 2006321434 A | 11/2006 |
| JP | 2012016964 A | 1/2012 |
| JP | 2016222224 A | 12/2016 |
| KR | 20090007105 A | 1/2009 |

OTHER PUBLICATIONS

Office Action for German Patent Application No. 112020006868.4 dated Aug. 28, 2024; 6 pps.
Office Action for Chinese Patent Application No. 202080097997.0 dated Jun. 9, 2023; 12 pp.
PCT International Search Report for Patent Application PCT/JP2020/009971 mailed Dec. 3, 2020; 2 pp.

* cited by examiner

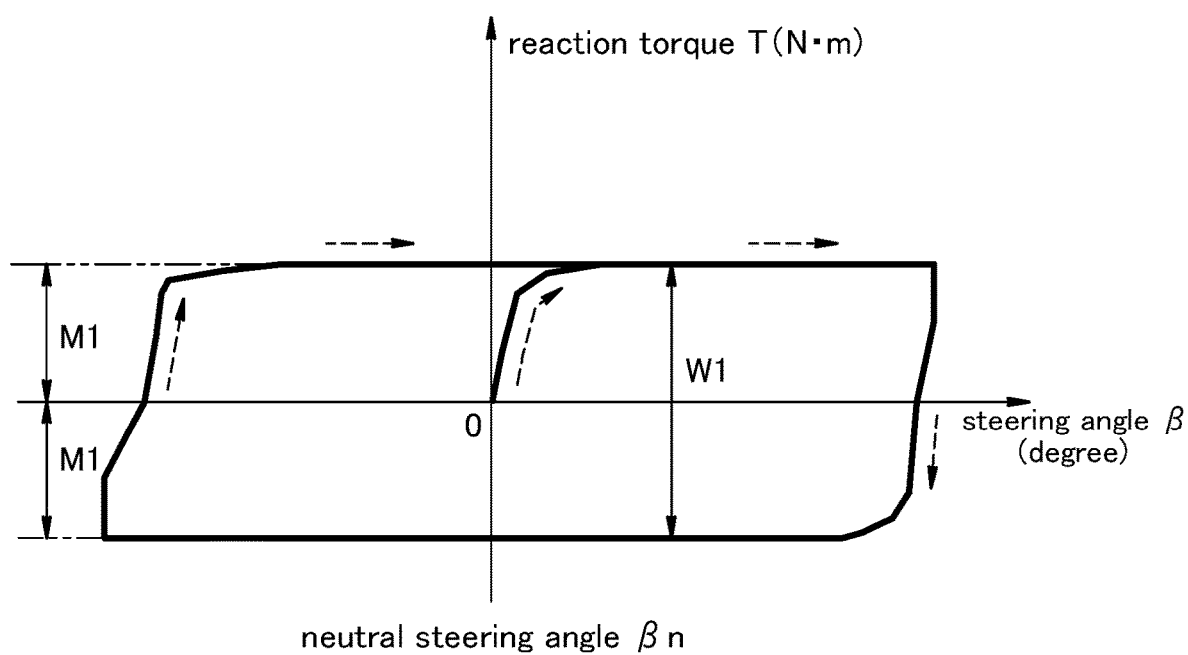

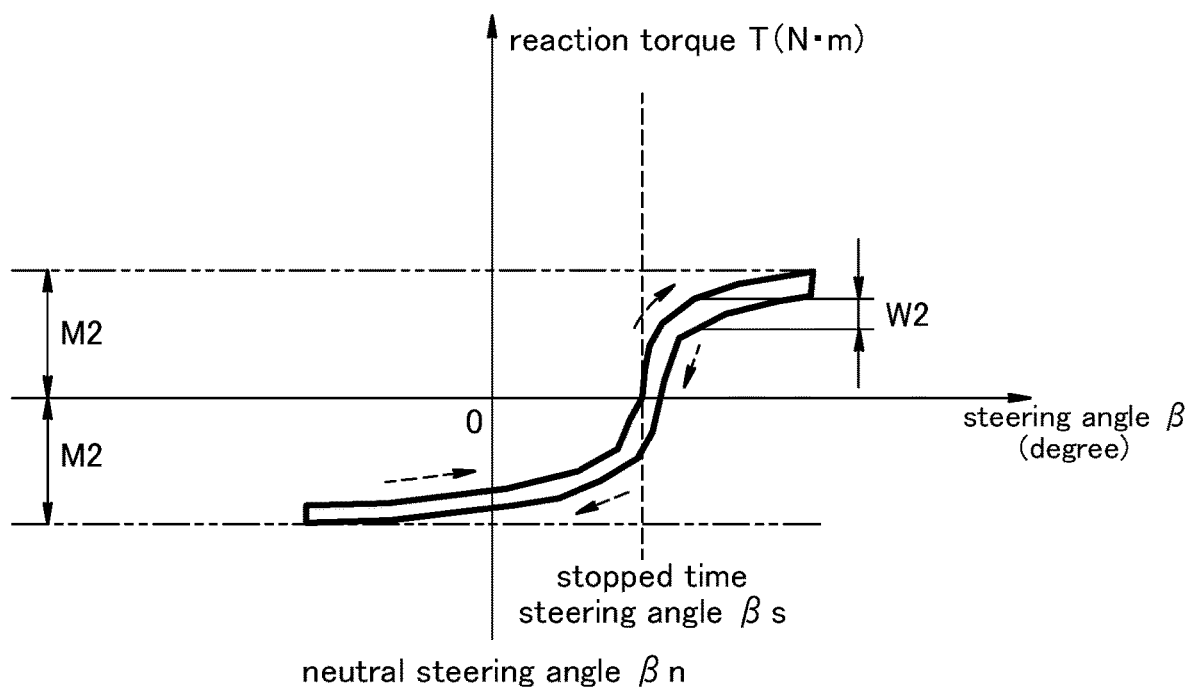

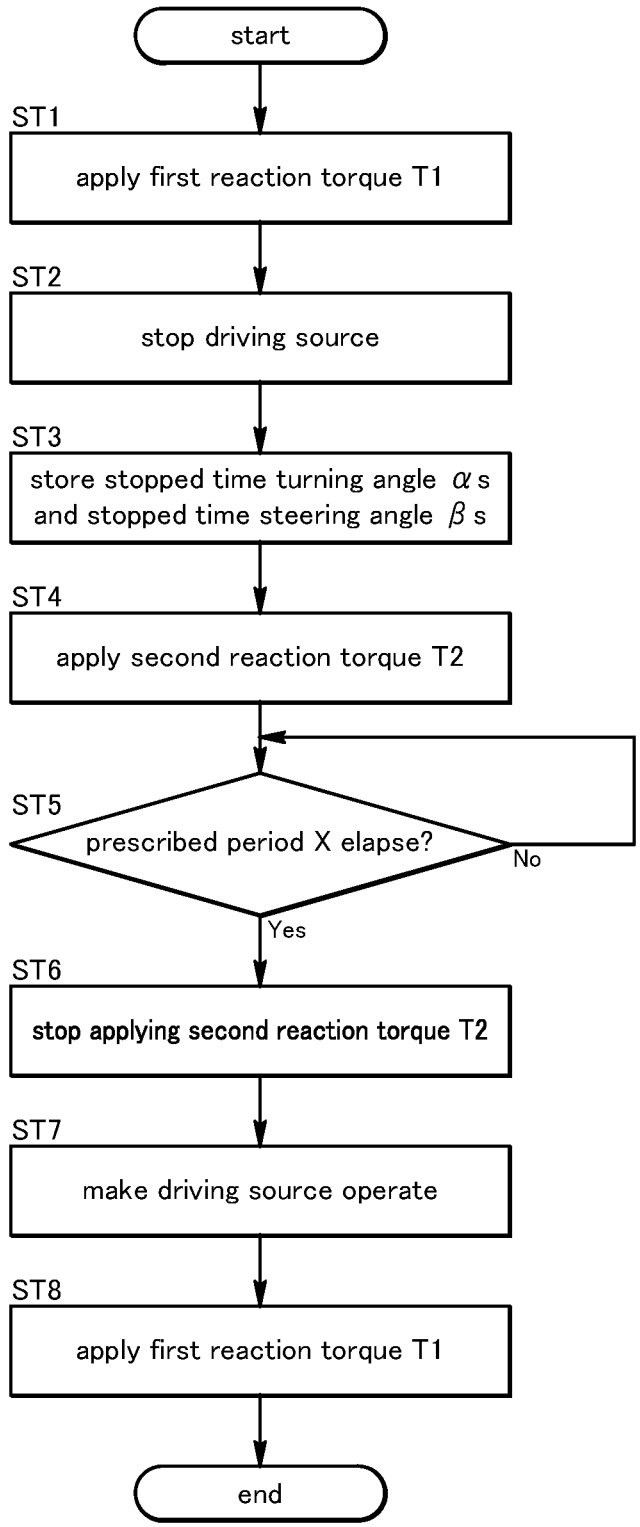

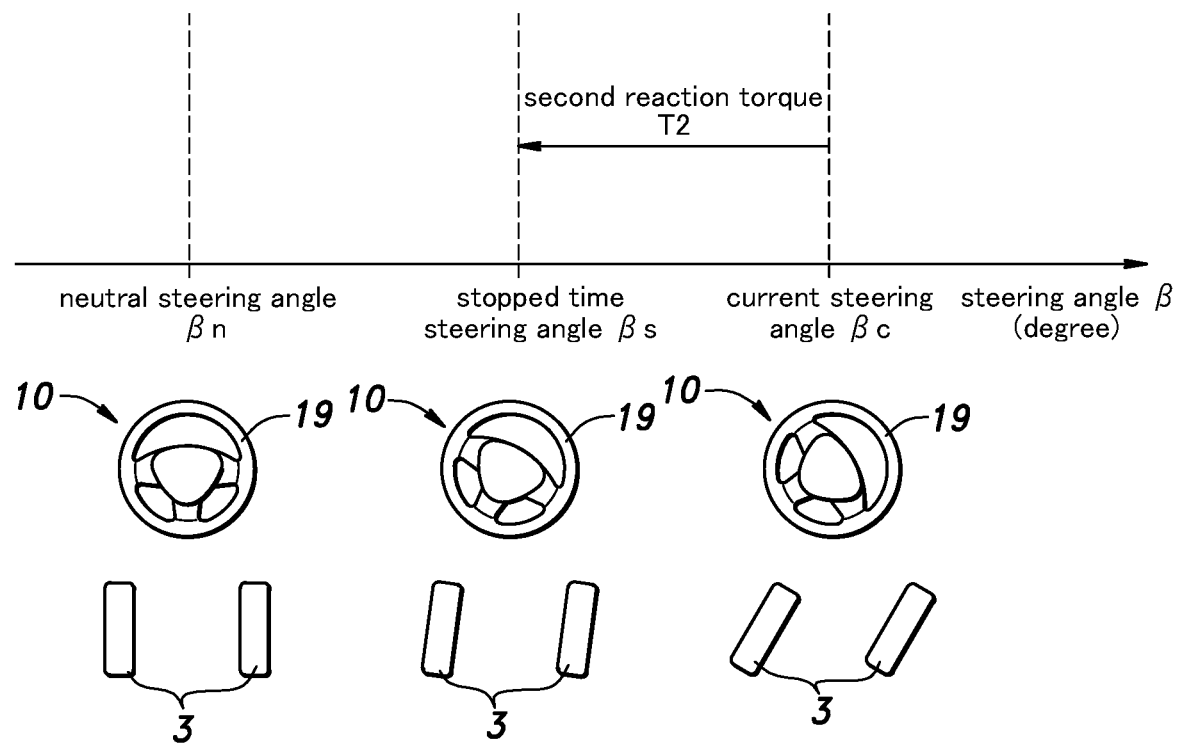

VEHICLE STEERING SYSTEM

CROSS-REFERENCE TO RELATED APPLICATION

This application is a U.S. National Phase Application of PCT/JP2020/009971 filed Mar. 9, 2020, the content of which is hereby expressly incorporated by reference in its entirety.

TECHNICAL FIELD

The present invention relates to a vehicle steering system.

BACKGROUND ART

A known steer-by-wire vehicle steering system includes a steering member such as a steering wheel operated by a driver and a turning mechanism mechanically separated from the steering member and configured to change a turning angle of wheels. For example, there is a steer-by-wire steering system that executes control to make a turning angle of wheels coincide with an actual rotational position of a steering wheel in a state where an engine is stopped (see Japanese Unexamined Patent Application Publication No. JP 2006-321434A).

However, if the above control is executed in the state where the engine is stopped, the steering wheel may be rotated in a direction unintended by the driver, or a reaction force in the direction unintended by the driver may be applied to the steering wheel. If such situations are created, the driver may feel uncomfortable in a case where the driver touches the steering wheel when getting on and out of the vehicle.

In view of such a problem of the prior art, a primary object of the present invention is to provide a steering control system that can prevent a driver from feeling uncomfortable when the driver touches a steering member in a state where a driving source is stopped.

SUMMARY OF INVENTION

To achieve such an object, one embodiment of the present invention provides a vehicle steering system (1) provided in a vehicle (2) that travels by a driving force generated by a driving source (51), including; a steering member (10) configured to accept a steering operation; and a reaction force actuator (13) configured to apply a reaction force to the steering member in response to the steering operation, wherein in a state where the driving source is stopped, the reaction force actuator is configured to apply the reaction force to the steering member based on a stopped time position that is a position of the steering member at a time when the driving source is stopped.

According to this arrangement, it is possible to prevent the steering member from being moved in a direction unintended by the driver and to prevent a reaction force in the direction unintended by the driver from being applied to the steering member, in the state where the driving source is stopped. Therefore, it is possible to prevent the driver from feeling uncomfortable in a case where the driver touches the steering member when getting on and out of the vehicle.

Preferably, in the state where the driving source is stopped, the reaction force actuator is configured to change the reaction force applied to the steering member based on displacement of the steering member with respect to the stopped time position.

According to this arrangement, in the state where the driving source is stopped, an appropriate reaction force according to the displacement of the steering member with respect to the stopped time position can be applied to the steering member. Therefore, it is possible to more effectively prevent the driver from feeling uncomfortable in the case where the driver touches the steering member when getting on and out of the vehicle.

Preferably, in the state where the driving source is stopped, the reaction force actuator is configured to stop applying the reaction force to the steering member after applying the reaction force to the steering member for a prescribed period.

According to this arrangement, the operation time of the reaction force actuator can be reduced in the state where the driving source is stopped, so that power consumption of the vehicle steering system can be suppressed.

Preferably, a maximum value of the reaction force that the reaction force actuator applies to the steering member in the state where the driving source is stopped is smaller than a maximum value of the reaction force that the reaction force actuator applies to the steering member in a state where the driving source is operating.

According to this arrangement, electric power necessary for the operation of the reaction force actuator can be reduced in the state where the driving source is stopped, so that the power consumption of the vehicle steering system can be suppressed.

Preferably, when the driving source starts to operate, the reaction force actuator is configured to apply the reaction force to the steering member based on a prescribed neutral position of the steering member in a last operation period of the driving source.

According to this arrangement, when the driving source starts operating, the reaction force applied to the steering member can be shifted from the reaction force based on the stopped time position to the reaction force based on the neutral position. Therefore, it is possible to prevent the driver from feeling uncomfortable when the driver performs a steering operation on the steering member in a state where the driving source is operating.

Preferably, in the state where the driving source is stopped, the reaction force actuator is configured to apply the reaction force to the steering member such that the steering member is restored to the stopped time position.

According to this arrangement, the steering member can be restored to the stopped time position even if the driver touches the steering member to displace the steering member from the stopped time position in a state where the driving source is stopped. Therefore, it is possible to more effectively prevent the driver from feeling uncomfortable.

Preferably, in a state where the driving source is operating, the reaction force actuator is configured to apply the reaction force to the steering member based on a prescribed neutral position of the steering member, and in a case where the driving source starts operating during restoration of the steering member to the stopped time position, the reaction force actuator is configured to apply the reaction force to the steering member based on the neutral position after the restoration of the steering member to the stopped time position is completed.

According to this arrangement, it is possible to apply the reaction force to the steering member based on the neutral position after the steering member is moved to a position where a turning angle of wheels matches a steering angle of the steering member. Thereby, it is possible to suppress a phase difference between the turning angle of the wheels and the steering angle of the steering member.

Preferably, in a case where the steering member accepts the steering operation during the restoration of the steering member to the stopped time position, the reaction force actuator is configured to stop the restoration of the steering member to the stopped time position and to shift the reaction force applied to the steering member from the reaction force based on the stopped time position to the reaction force based on the neutral position.

According to this arrangement, it is possible to shorten a period to complete the shift of the reaction force, compared with a case where the reaction force is shifted after the steering member is restored to the stopped time position.

Preferably, the steering member is rotatably provided on a vehicle body, and the reaction force actuator is configured to apply reaction torque to the steering member.

According to this arrangement, in the vehicle steering system provided with the rotatable steering member, it is possible to prevent the driver from feeling uncomfortable when the driver touches the steering member in the state where the driving source is stopped.

Preferably, the vehicle steering system further includes a turning mechanism (11) mechanically separated from the steering member and configured to change a turning angle of wheels (3).

According to this arrangement, in the steer-by-wire vehicle steering system, it is possible to prevent the driver from feeling uncomfortable when the driver touches the steering member in the state where the driving source is stopped.

BRIEF DESCRIPTION OF DRAWINGS

FIG. 2A is a graph showing a first control map.

FIG. 2B is a graph showing a second control map.

FIG. 3 is a flow chart showing applying control of reaction torque.

FIG. 4B is a schematic diagram showing a second reaction torque applied in a state where the driving source is stopped.

DESCRIPTION OF EMBODIMENTS

<Vehicle Steering System 1>

Figure 1:
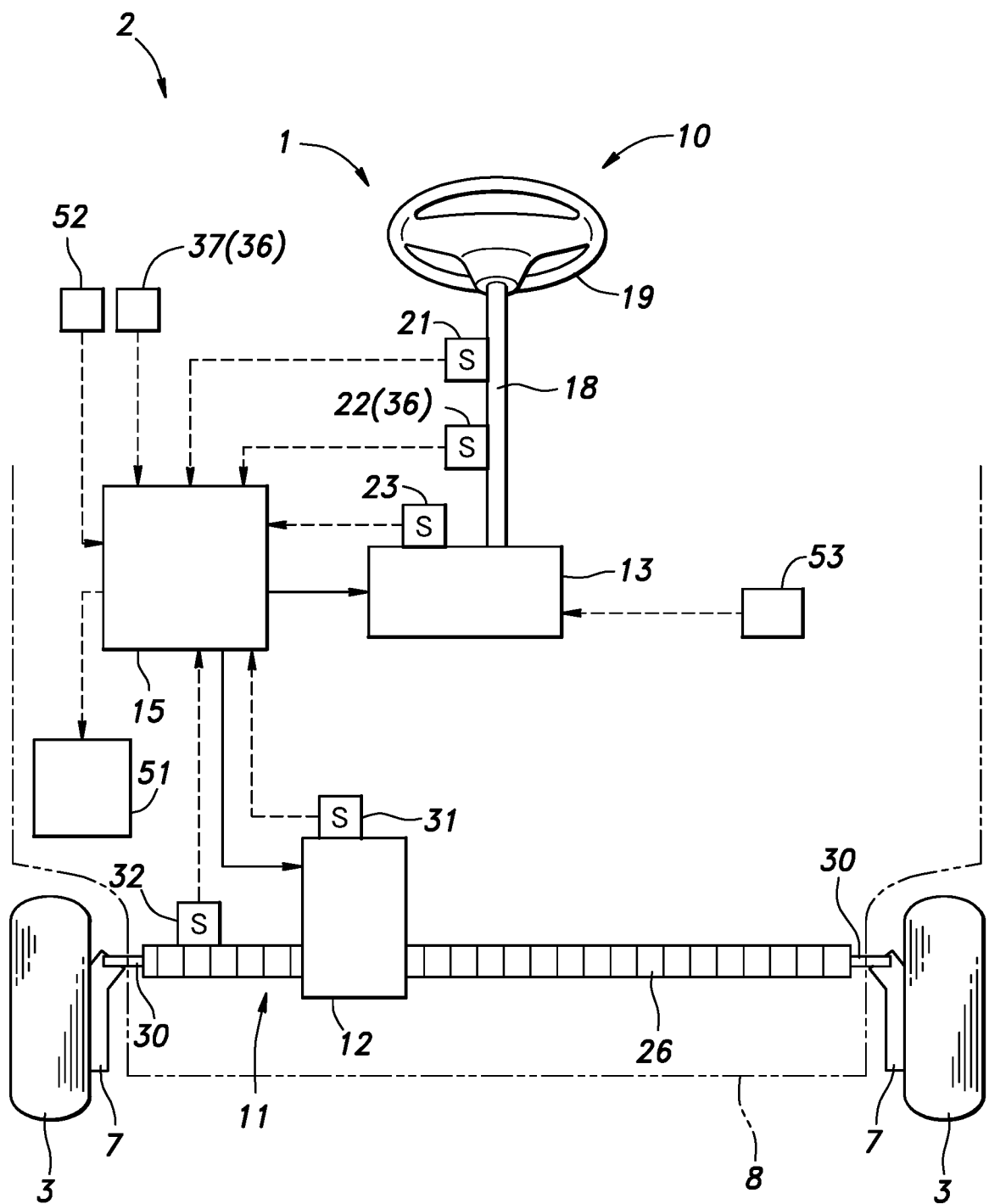
FIG. 1 is a configuration diagram of a vehicle steering system according to an embodiment of the present invention.

An embodiment of a vehicle steering system 1 according to the present invention is described in the following. As shown in FIG. 1, the vehicle steering system 1 consists of a steer-by-wire (SBW) steering system. A vehicle 2 provided with the vehicle steering system 1 is a four-wheeled vehicle including a pair of front wheels 3 and a pair of rear wheels (not shown in the drawings). Each front wheel 3 is supported by a vehicle body 8 (only an outline of a lower part thereof is shown in FIG. 1) via a knuckle 7 so that a turning angle α can be changed, and thus serves as a wheel to be turned. The turning angle α is defined as an angle of each front wheel 3 with respect to a fore and aft direction in a plan view. The vehicle steering system 1 changes the turning angle α of each front wheel 3.

The vehicle steering system 1 includes a steering member 10 rotatably provided on the vehicle body 8, a turning mechanism 11 that turns the front wheels 3, a turning actuator 12 that drives the turning mechanism 11, a reaction force actuator 13 that applies a reaction torque T to the steering member 10, and a control unit 15 that controls the reaction force actuator 13 and the turning actuator 12. The vehicle steering system 1 may be provided with redundancy for an enhanced reliability. For instance, the vehicle steering system 1 may be provided with a plurality of turning actuators 12, a plurality of reaction force actuators 13, and/or a plurality of control units 15.

The steering member 10 accepts a steering operation by a driver. The steering member 10 includes a steering shaft 18 that is rotatably supported by the vehicle body 8, and a steering wheel 19 provided at an end of the steering shaft 18. The steering shaft 18 is rotatably supported by a steering column (not shown in the drawings) provided on the vehicle body 8, and the rear end thereof protrudes rearward from the steering column. The steering wheel 19 is connected to the rear end of the steering shaft 18 so as to rotate integrally with the steering shaft 18.

The reaction force actuator 13 consists of an electric motor, and is connected to the steering shaft 18 via a gear mechanism. When the reaction force actuator 13 is driven, a driving force thereof is transmitted to the steering shaft 18 as a rotational force. The reaction force actuator 13 applies torque to the steering member 10 by rotating. The torque that the reaction force actuator 13 applies to the steering member 10 in response to the steering operation is defined as reaction torque T.

The vehicle steering system 1 further includes a steering angle sensor 21 that detects a rotational angle of the steering shaft 18 around the central axial line thereof as a steering angle β. The steering angle sensor 21 may consist of a per se known rotary encoder. Further, the vehicle steering system 1 includes a torque sensor 22 that detects torque applied to the steering shaft 18 as steering torque. The torque sensor 22 detects the steering torque applied to a part of the steering shaft 18 located between the steering wheel 19 and the reaction force actuator 13. The steering torque is determined by operation torque applied to the steering wheel 19 by a driver and the reaction torque T applied to the steering shaft 18 by the reaction force actuator 13. The torque sensor 22 may consist of a per se known torque sensor such as a magnetostrictive torque sensor and a strain gauge. Also, the torque sensor 22 may estimate the steering torque based on the electric current flowing to the reaction force actuator 13.

The vehicle steering system 1 further includes a first rotational angle sensor 23 that detects a rotational angle of the reaction force actuator 13. The first rotational angle sensor 23 may consist of a per se known resolver or rotary encoder.

The turning mechanism 11 includes a rack shaft 26 extending laterally. The rack shaft 26 is supported by the vehicle body 8 so as to be movable in a lateral direction. The left and right ends of the rack shaft 26 are connected to the knuckles 7 via tie rods 30, and the knuckles 7 support the left and right front wheels 3, respectively. As the rack shaft 26 moves in the lateral direction, the turning angle α of each front wheel 3 changes. The turning mechanism 11 is mechanically separated from the steering member 10.

The turning actuator 12 consists of an electric motor. The turning actuator 12 moves the rack shaft 26 in the lateral direction based on a signal from the control unit 15 so as to change the turning angle α of the left and right front wheels 3.

The vehicle steering system 1 further includes a second rotational angle sensor 31 that detects a rotational angle of the turning actuator 12. The second rotational angle sensor 31 may consist of a per se known resolver or rotary encoder. In addition, the vehicle steering system 1 includes a turning angle sensor 32 that detects the turning angle α of the front wheels 3. In the present embodiment, the turning angle sensor 32 consists of a rack stroke sensor that detects a rack position or a position of the rack shaft 26 in the lateral direction, and detects the turning angle α of the front wheels 3 based on the rack position.

The vehicle steering system 1 further includes a detection device 36 that detects the driver's input operation. The detection device 36 may include the torque sensor 22 and/or the steering angle sensor 21 that detects the driver's steering operation. The detection device 36 may include a switch 37 that is operated by the driver. The switch 37 may consist of a mechanical switch provided on the vehicle body 8 or a function button displayed on a touch panel display.

The control unit 15 is an electronic control device including a CPU, memory, a storage device storing a program, and the like. The control unit 15 is connected to the steering angle sensor 21, the torque sensor 22, the first rotational angle sensor 23, the second rotational angle sensor 31, and the turning angle sensor 32. Based on the signals from these sensors, the control unit 15 acquires signals corresponding to the steering angle β, the steering torque, the rotational angle of the reaction force actuator 13, the rotational angle of the turning actuator 12, and the turning angle α. In addition, the control unit 15 may be connected to a vehicle speed sensor, a yaw rate sensor, and a fore and aft acceleration sensor (not shown in the drawings) to acquire a vehicle speed, a yaw rate, a fore and aft acceleration, and the like.

The control unit 15 is connected to the reaction force actuator 13 and the turning actuator 12 to control the reaction force actuator 13 and the turning actuator 12. The control unit 15 controls the turning actuator 12 so as to realize the turning angle α corresponding to at least one of the steering angle β and the steering torque, and controls the reaction force actuator 13 according to the turning angle α.

<Operation and Stop of Driving Source 51>

With reference to FIG. 1, the vehicle steering system 1 further includes a driving source 51 and a driving switch 52. The driving source 51 is a device that generates a driving force for driving the vehicle 2. The driving source 51 includes, for example, at least one of an internal combustion engine and an electric motor. The driving switch 52 is a switch that accepts a driving operation and a stop operation of the driving source 51. The driving switch 52 may consist of a mechanical switch provided on the vehicle body 8 or a function button displayed on a touch panel display.

The control unit 15 is connected to the driving source 51 and the driving switch 52, and controls the driving source 51 in response to a signal from the driving switch 52. For example, when the driver performs the driving operation of the driving source 51 on the driving switch 52 in a state where the driving source 51 is stopped, the driving switch 52 accepts the driving operation of the driving source 51. Accordingly, the driving switch 52 sends a driving signal to the control unit 15. The control unit 15 makes the driving source 51 operate in response to the driving signal from the driving switch 52. Thereby, the driving source 51 generates the driving force, and the vehicle 2 can travel by the driving force. Hereinafter, the driving force generated by the driving source 51 is simply referred to as "the driving force".

On the other hand, when the driver performs the stop operation of the driving source 51 on the driving switch 52 in a state where the driving source 51 is operating, the driving switch 52 accepts the stop operation of the driving source 51. Accordingly, the driving switch 52 sends a stop signal to the control unit 15. The control unit 15 stops the driving source 51 in response to the stop signal from the driving switch 52.

<Control Maps of Reaction Torque T>

The control unit 15 stores a first control map (see FIG. 2A) and a second control map (see FIG. 2B) as control maps of the reaction torque T (an example of a reaction force). The control unit 15 controls the reaction torque T based on the first control map in the state where the driving source 51 is operating. The control unit 15 controls the reaction torque T based on the second control map in the state where the driving source 51 is stopped.

Horizontal axes of the first and second control maps indicate the steering angle β (an example of a position of the steering member 10). Hereinafter, the steering angle β of 0 degree is referred to as a neutral steering angle βn. The steering angle β larger than the neutral steering angle βn is the steering angle β in a right turning direction, and the steering angle β smaller than the neutral steering angle βn is the steering angle β in a left turning direction. Vertical axes of the first and second control maps indicate the reaction torque T. The reaction torque T larger than zero is the reaction torque T with respect to the right turning direction, and the reaction torque T smaller than zero is the reaction torque T with respect to the left turning direction. The dotted arrows shown in the first and second control maps indicate directions in which the steering angle β and the reaction torque T change.

In the first control map, a relationship between the steering angle β and the reaction torque T (hysteresis characteristic of the steering angle β and the reaction torque T) is defined based on the neutral steering angle βn (an example of a neutral position). In the first control map, the reaction torque T changes from zero as the steering angle β changes from the neutral steering angle βn. In the first control map, the reaction torque T changes based on displacement of the steering angle β with respect to the neutral steering angle βn. Specifically, in the first control map, an absolute value of the reaction torque T increases as the displacement of the steering angle β with respect to the neutral steering angle βn increases.

In the second control map, a relationship between the steering angle β and the reaction torque T (hysteresis characteristic of the steering angle β and the reaction torque T) is defined based on a stopped time steering angle βs (an example of a stopped time position). The stopped time steering angle βs is the steering angle β at a time when the driving source 51 is stopped. "a time when the driving source 51 is stopped" may be, for example, a time when the driving switch 52 accepts the stop operation of the driving source 51, a time when the driving source 51 starts to be stopped, or a time when the driving source 51 is completely stopped. In the second control map, the reaction torque T changes from zero as the steering angle β changes from the stopped time steering angle βs. In the second control map, the reaction torque T changes based on displacement of the steering angle β with respect to the stopped time steering angle βs. Specifically, in the second control map, an absolute value of the reaction torque T increases as the displacement of the steering angle β with respect to the stopped time steering angle βs increases. In the second control map, a changing rate (inclination) of the absolute value of the reaction torque T decreases as the displacement of the steering angle β with respect to the stopped time steering angle βs increases. Therefore, in the second control map, the absolute value of the reaction torque T is substantially saturated in a region where the displacement of the steering angle β with respect to the stopped time steering angle βs becomes maximum.

The maximum value M2 of the absolute value of the reaction torque T in the second control map is smaller than the maximum value M1 of the absolute value of the reaction torque T in the first control map. A hysteresis width W2 (width of a hysteresis in a vertical axis direction) in the second control map is narrower than a hysteresis width W1 in the first control map.

<Applying Control of Reaction Torque T>

Next, an example of applying control of the reaction torque T is described with reference to FIG. 3.

Figure 4A:
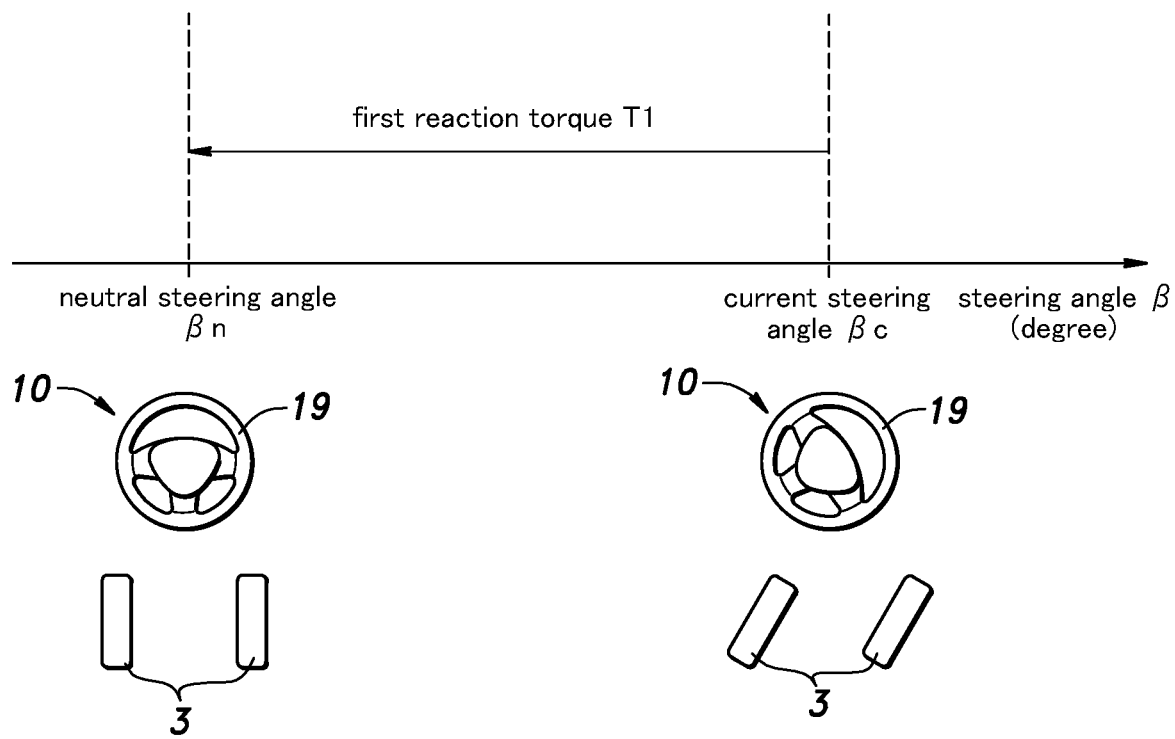
FIG. 4A is a schematic diagram showing a first reaction torque applied in a state where the driving source is operating.

The driving source 51 is operating at a start of the applying control of the reaction torque T. Therefore, the control unit 15 controls the reaction torque T based on the first control map (see FIG. 2A), and the reaction force actuator 13 applies the reaction torque T based on the neutral steering angle βn (hereinafter referred to as "the first reaction torque T1") to the steering member 10 (step ST1). As shown in FIG. 4A, the reaction force actuator 13 changes the first reaction torque T1 applied to the steering member 10 based on displacement of the steering member 10 with respect to the neutral steering angle βn (the current steering angle βc—the neutral steering angle βn). For example, the reaction force actuator 13 increases the first reaction torque T1 applied to the steering member 10 as the displacement of the steering member 10 with respect to the neutral steering angle βn increases.

When the driver performs the stop operation of the driving source 51 on the driving switch 52 in the state where the driving source 51 is operating as described above, the driving switch 52 accepts the stop operation of the driving source 51. The control unit 15 stops the driving source 51 in response to the stop signal from the driving switch 52 (step ST2).

When the driving source 51 is stopped as described above, the control unit 15 acquires a stopped time turning angle as (the turning angle α at a time when the driving source 51 is stopped) based on a signal from the turning angle sensor 32, and stores the stopped time turning angle as. Further, the control unit 15 acquires the stopped time steering angle βs (the steering angle β at a time when the driving source 51 is stopped) based on a signal from the steering angle sensor 21, and stores the stopped time steering angle βs (step ST3).

When the driving source 51 is stopped as described above, the control unit 15 shifts the control map of the reaction torque T from the first control map (see FIG. 2A) to the second control map (see FIG. 2B). Therefore, the reaction force actuator 13 applies the reaction torque T based on the stopped time steering angle βs (hereinafter referred to as "the second reaction torque T2") to the steering member 10 (step ST4). As shown in FIG. 4B, the reaction force actuator 13 changes the second reaction torque T2 applied to the steering member 10 based on displacement of the steering member 10 with respect to the stopped time steering angle βs (the current steering angle βc—the stopped time steering angle βs). For example, the reaction force actuator 13 increases the second reaction torque T2 applied to the steering member 10 as the displacement of the steering member 10 with respect to the stopped time steering angle βs increases. Further, the reaction force actuator 13 applies the second reaction torque T2 to the steering member 10 such that the steering member 10 is restored to the stopped time steering angle βs.

Incidentally, in step ST2, the driving switch 52 may accept the stop operation of the driving source 51 when the torque sensor 22 detects the steering operation. In this case, in step ST4, the reaction force actuator 13 may gradually shift the reaction torque T applied to the steering member 10 from the first reaction torque T1 to the second reaction torque T2. Thereby, it is possible to suppress the driver from feeling uncomfortable due to a sudden change in the reaction torque T.

Next, the control unit 15 determines whether a prescribed period X has elapsed since the reaction force actuator 13 starts applying the second reaction torque T2 to the steering member 10 in step ST4 (step ST5).

If determination in step ST5 is No, the control unit 15 repeats the determination in step ST5 until the determination in step ST5 becomes Yes. On the other hand, if the determination in step ST5 is Yes, the control unit 15 stops the reaction force actuator 13. Accordingly, the reaction force actuator 13 stops applying the second reaction torque T2 to the steering member 10 (step ST6). Incidentally, the reaction force actuator 13 may resume applying the second reaction torque T2 to the steering member 10 in a case where a boarding sensor 53 (see FIG. 1) detects that the driver is about to get on or has got on the vehicle 2 after an end of step ST6 and before a start of step ST7. For example, the boarding sensor 53 may be a sensor that detects that a door of the vehicle 2 is unlocked, or may be a sensor that detects that the door of the vehicle 2 is opened. Also, the reaction force actuator 13 may apply the second reaction torque T2 to the steering member 10 while the boarding sensor 53 detects that the door of the vehicle 2 is opened before step ST4 is started. Further, the reaction force actuator 13 may apply a third reaction torque T3, which is different from the second reaction torque T2, to the steering member 10 in a case where the boarding sensor 53 detects that the driver is about to get on or has got on the vehicle 2 or that the door of the vehicle 2 is opened. Preferably, the third reaction torque T3 may be larger than the second reaction torque T2.

When the driver performs the driving operation of the driving source 51 on the driving switch 52 in the state where the driving source 51 is stopped as described above, the driving switch 52 accepts the driving operation of the driving source 51. The control unit 15 makes the driving source 51 operate again in response to the driving signal from the driving switch 52 (step ST7)

In the state where the driving source 51 is operating as described above, the control unit 15 controls the reaction torque T based on the first control map (see FIG. 2A). Therefore, the reaction force actuator 13 applies the first reaction torque T1 (the reaction torque T based on the neutral steering angle βn) to the steering member 10 (step ST8). The neutral steering angle βn in this step ST8 is the neutral steering angle βn in a last operation period of the driving source 51 (for example, the neutral steering angle βn when the driving source 51 has started operating last time).

As described above, the reaction force actuator 13 applies the first reaction torque T1 (the reaction torque T based on the neutral steering angle βn) to the steering member 10 in the state where the driving source 51 is operating (see steps ST1 and ST8). Thereby, an appropriate reaction torque T based on the displacement of the steering member 10 with respect to the neutral steering angle βn can be applied to the steering member 10 in the state where the driving source 51 is operating.

On the other hand, the reaction force actuator 13 applies the second reaction torque T2 (the reaction torque T based on the stopped time steering angle βs) to the steering member 10 in the state where the driving source 51 is stopped (see step ST4). Thereby, an appropriate reaction torque T based on the displacement of the steering member 10 with respect to the stopped time steering angle βs can be applied to the steering member 10 in the state where the driving source 51 is stopped. Therefore, it is possible to prevent the steering member 10 from being moved in a direction unintended by the driver and to prevent the reaction torque T in a direction unintended by the driver from being applied to the steering member 10 in the state where the driving source 51 is stopped. Therefore, it is possible to prevent the driver from feeling uncomfortable in a case where the driver touches the steering member 10 when getting on and out of the vehicle 2.

Further, the reaction force actuator 13 stops applying the second reaction torque T2 to the steering member 10 after applying the second reaction torque T2 to the steering member 10 for the prescribed period X in the state where the driving source 51 is stopped (see step ST6). Thereby, the operation time of the reaction force actuator 13 can be reduced in the state where the driving source is stopped, so that power consumption of the vehicle steering system 1 can be suppressed. In other embodiments, the reaction force actuator 13 may always apply the second reaction torque T2 to the steering member 10 in the state where the driving source 51 is stopped.

As described above, the maximum value M2 of the absolute value of the reaction torque T in the second control map (see FIG. 2B) is smaller than the maximum value M1 of the absolute value of the reaction torque T in the first control map (see FIG. 2A). Therefore, the maximum value of the second reaction torque T2 (the reaction torque T in the state where the driving source 51 is stopped) is smaller than the maximum value of the first reaction torque T1 (the reaction torque T in the state where the driving source 51 is operating). Therefore, electric power necessary for the operation of the reaction force actuator 13 can be reduced in the state where the driving source 51 is stopped, so that the power consumption of the vehicle steering system 1 can be further suppressed. In other embodiments, the maximum value of the second reaction torque T2 may be equal to or larger than the maximum value of the first reaction torque T1.

Further, when the driving source 51 that has been stopped starts operating, the reaction force actuator 13 applies the first reaction torque T1, which is based on the neutral steering angle βn in the last operation period of the driving source 51, to the steering member 10 (see step ST8). Accordingly, when the driving source 51 that has been stopped starts operating, the reaction torque T applied to the steering member 10 can be shifted from the second reaction torque T2 to the first reaction torque T1. Therefore, it is possible to prevent the driver from feeling uncomfortable when the driver performs the steering operation on the steering member 10 in the state where the driving source 51 is operating.

Further, the reaction force actuator 13 applies the second reaction torque T2 to the steering member 10 such that the steering member 10 is restored to the stopped time steering angle βs in the state where the driving source 51 is stopped (see step ST4). Accordingly, the steering member 10 can be restored to the stopped time steering angle βs even if the driver touches the steering member 10 (for example, the steering wheel 19) to displace the steering member 10 from the stopped time steering angle βs in the state where the driving source is stopped. Therefore, it is possible to more effectively prevent the driver from feeling uncomfortable.

By the way, the driving source 51 may start operating during the restoration of the steering member 10 to the stopped time steering angle βs in the state where the driving source 51 is stopped. In this case, the reaction force actuator 13 may apply the first reaction torque T1 to the steering member 10 after the restoration of the steering member 10 to the stopped time steering angle βs is completed. Accordingly, it is possible to apply the first reaction torque T1 to the steering member 10 after the steering member 10 is rotated to a position where the turning angle α matches the steering angle β. Thereby, it is possible to suppress a phase difference between the turning angle α and the steering angle β.

Further, the steering member 10 may accept the steering operation during the restoration of the steering member 10 to the stopped time steering angle βs in the state where the driving source 51 is stopped. In this case, the reaction force actuator 13 may stop the restoration of the steering member 10 to the stopped time steering angle βs and shift the reaction torque T applied to the steering member 10 from the second reaction torque T2 to the first reaction torque T1. Accordingly, it is possible to shorten a period to complete the shift of the reaction torque T, compared with a case where the reaction torque T is shifted after the steering member 10 is restored to the stopped time steering angle βs. Preferably, the reaction force actuator 13 may gradually shift the reaction torque T applied to the steering member 10 from the second reaction torque T2 to the first reaction torque T1 in a case where the steering member 10 accepts the steering operation during the restoration of the steering member 10 to the stopped time steering angle βs in the state where the driving source 51 is stopped. Thereby, it is possible to suppress the driver from feeling uncomfortable due to a sudden change in the reaction torque T.

In the present embodiment, the steering member 10 is rotatably provided. On the other hand, in other embodiments, the steering member 10 may be provided so as to be linearly movable in the fore and aft direction or the lateral direction. In this case, the reaction force that the reaction force actuator 13 applies to the steering member 10 may be a linear reaction force instead of the reaction torque T.

In the present embodiment, the turning mechanism 11 is always mechanically separated from the steering member 10. On the other hand, in other embodiments, a state where the turning mechanism 11 is mechanically separated from the steering member 10 and a state where the turning mechanism 11 is mechanically connected to the steering member 10 may be switched by a clutch.

Concrete embodiments of the present invention have been described in the foregoing, but the present invention should not be limited by the foregoing embodiments and various modifications and alterations are possible within the scope of the present invention.

LIST OF THE NUMERALS

1: vehicle steering system
2: vehicle
3. front wheels (an example of wheels)
10: steering member
11: turning mechanism
13: reaction force actuator
51: driving source

The invention claimed is:

1. A vehicle steering system provided in a vehicle that travels by a driving force generated by a driving source, comprising;

a steering member configured to accept a steering operation; and a reaction force actuator configured to apply a reaction force to the steering member in response to the steering operation, wherein in a state where the driving source is stopped, the reaction force actuator is configured to apply the reaction force to the steering member based on a stopped time position that is a position of the steering member at a time when the driving source is stopped, and a maximum value of the reaction force that the reaction force actuator applies to the steering member in the state where the driving source is stopped is smaller than a maximum value of the reaction force that the reaction force actuator applies to the steering member in a state where the driving source is operating.

2. The vehicle steering system according to claim 1, wherein in the state where the driving source is stopped, the reaction force actuator is configured to change the reaction force applied to the steering member based on displacement of the steering member with respect to the stopped time position.

3. The vehicle steering system according to claim 1, wherein in the state where the driving source is stopped, the reaction force actuator is configured to stop applying the reaction force to the steering member after applying the reaction force to the steering member for a prescribed period.

4. The vehicle steering system according to claim 1, wherein when the driving source starts to operate, the reaction force actuator is configured to apply the reaction force to the steering member based on a prescribed neutral position of the steering member in a last operation period of the driving source.

5. The vehicle steering system according to claim 1, wherein in the state where the driving source is stopped, the reaction force actuator is configured to apply the reaction force to the steering member such that the steering member is restored to the stopped time position.

6. The vehicle steering system according to claim 1, wherein the steering member is rotatably provided on a vehicle body, and the reaction force actuator is configured to apply reaction torque to the steering member.

7. The vehicle steering system according to claim 1, further comprising a turning mechanism mechanically separated from the steering member and configured to change a turning angle of wheels.

8. A vehicle steering system provided in a vehicle that travels by a driving force generated by a driving source, comprising;

a steering member configured to accept a steering operation; and a reaction force actuator configured to apply a reaction force to the steering member in response to the steering operation, wherein in a state where the driving source is stopped, the reaction force actuator is configured to apply the reaction force to the steering member based on a stopped time position that is a position of the steering member at a time when the driving source is stopped, in the state where the driving source is stopped, the reaction force actuator is configured to apply the reaction force to the steering member such that the steering member is restored to the stopped time position, in a state where the driving source is operating, the reaction force actuator is configured to apply the reaction force to the steering member based on a prescribed neutral position of the steering member, and in a case where the driving source starts operating during restoration of the steering member to the stopped time position, the reaction force actuator is configured to apply the reaction force to the steering member based on the neutral position after the restoration of the steering member to the stopped time position is completed.

9. The vehicle steering system according to claim 8, wherein in a case where the steering member accepts the steering operation during the restoration of the steering member to the stopped time position, the reaction force actuator is configured to stop the restoration of the steering member to the stopped time position and to shift the reaction force applied to the steering member from the reaction force based on the stopped time position to the reaction force based on the neutral position.

* * * * *